US007171874B1

(12) United States Patent
Huang

(10) Patent No.: US 7,171,874 B1
(45) Date of Patent: Feb. 6, 2007

(54) HANDLE COLLECTING STRUCTURE FOR SOCKET WRENCH

(76) Inventor: Chin-Chen Huang, No.12, 41st Road, Industry Zone, Shitun District, Taichung (TW)

( * ) Notice: Subject to any disclaimer, the term of this patent is extended or adjusted under 35 U.S.C. 154(b) by 0 days.

(21) Appl. No.: 11/179,578

(22) Filed: Jul. 13, 2005

(51) Int. Cl.
*B25B 23/16* (2006.01)
*B25G 1/08* (2006.01)
*B25G 3/18* (2006.01)
*F16B 21/00* (2006.01)
*F16D 1/00* (2006.01)

(52) U.S. Cl. .................................... 81/177.4; 403/329

(58) Field of Classification Search ............... 81/177.4; 403/326, 329, 379.5, 263; 16/111.1; 220/326, 220/780, 786, 787, 324; 292/303; 285/901
See application file for complete search history.

(56) References Cited

U.S. PATENT DOCUMENTS 2,582,446 A * 1/1952 Martinet ........................ 285/7
3,899,085 A * 8/1975 Chaparro et al. ........ 198/345.3
4,253,356 A * 3/1981 Martinmaas ............... 81/177.4
4,302,990 A * 12/1981 Chrichton et al. ............. 81/60
4,627,315 A * 12/1986 Lin .......................... 81/177.4
5,205,431 A * 4/1993 Zinnbauer ................... 220/326
5,462,380 A * 10/1995 Peek et al. .................. 403/329
5,482,223 A * 1/1996 Bresina et al. ........... 242/348.4
5,887,306 A * 3/1999 Huang .......................... 7/165
6,314,600 B1 * 11/2001 Cachot .......................... 7/128
6,349,623 B1 * 2/2002 Peters ....................... 81/177.4
6,457,386 B1 * 10/2002 Chiang .......................... 81/62
6,634,262 B2 * 10/2003 Malchus ...................... 81/490
6,684,738 B2 * 2/2004 Huang ........................... 81/60
6,718,850 B2 * 4/2004 Huang ....................... 81/57.29
2002/0174748 A1 * 11/2002 Peters ....................... 81/177.4

* cited by examiner

*Primary Examiner*—Joseph J. Hail, III
*Assistant Examiner*—Bryan Muller
(74) *Attorney, Agent, or Firm*—Rabin & Berdo, P.C.

(57) ABSTRACT

A socket storage arrangement for a socket wrench includes a handle having an accommodating chamber formed therein. A pending platform includes a semi-cylindrical long rod seat body which is removably insertable into the accommodating chamber. The seat body is formed with a plurality of separated slot seats each having a different dimension for respectively accommodating a different sized socket. The seat body further includes a plurality of projecting pivoting pieces, each being formed on a side wall of a respective slot seat. Each projecting pivoting piece projects radially into the accommodating chamber, and presses against a respective socket received within the respective slot seat, to retain the socket within the slot seat.

2 Claims, 2 Drawing Sheets

HANDLE COLLECTING STRUCTURE FOR SOCKET WRENCH

BACKGROUND OF THE INVENTION

1. Field of the Invention

This invention relates to a handle collecting structure for a socket wrench. This structure improves the collecting mode of the U.S. Pat. No. 6,684,738B2, and also improves the stiffness between the handle and the rotating rod. Meanwhile, it is also a structure having a handle which can collect some sockets neatly and is very convenient to use.

2. Description of the Prior Art

The prior art socket wrench usually has a head part of a wrench body extending horizontally. In a one-piece handle part of an appropriate length, there is a vertically oriented round chamber to be inserted by a rotating head. Through a tooth installed at the inner wall of the chamber, and a corresponding protecting piece installed at the two sides of the rotating head, when an adjustment knob on top of the rotating head is operated to select right or left rotation, it can trigger a change on one side of the projecting piece which protrudes to the side surface of the rotating head. It can then touch the tooth installed at the inner of the round chamber either to the right or to the left. The rotating head can thus have torque output either to the left or to the right in the head end part chamber. Therefore, the operation to fix or loosen the bolt can be achieved easily. In, fact during the fixing or loosening of the bolt in the prior art socket wrench, the square embedded head of the rotating head is the torque output end, and the handle is the operation torque input end. That is, the torque output end touches the bolt vertically and downwards, and the torque output end in operation forms a horizontal crossing angle to it. When the palm of the user grasps the handle part to perform a reciprocating stroke action, it is difficult to keep at a certain height (i.e., an up and down irregular vibration will be seen). Therefore, a stable touch of the rotating head with the bolt will be affected, and the torque output is thus unstable. Thus, certain degree of operation difficulty obviously exists. Furthermore, in the initial stage of the bolt fixing, the bolt screws into the object but an appropriate fixing force is not reached yet. Meanwhile, the handle part is preparing for the backward stroke of next torque output, therefore, the bolt does not have a sufficient fixing force to counteract on the rotating head. At this moment, the rotating head and the bolt that touches it will be moved simultaneously by the handle part toward a direction that will lose their fixing force. Therefore, non-smooth and difficult operations do exist in the initial stage of bolt fixing. Moreover, if the bolt length is a little bit too long and the appropriate fixing force is not reached yet, it will thus be difficult for the handle part to keep a horizontal reciprocating action. This will in turn affect the rotating head to touch precisely the bolt and to screw it forward. The fixing operation can thus fail easily.

Prior art U.S. Pat. No. 6,718,850 B2 "TORQUE TRANSFER MECHANISM FOR SOCKET WRENCH", targets the above-mentioned problem. The inside of the handle part of the prior art socket wrench is installed with a pivoting hole slot which penetrates into the round chamber of the head end part. An open chamber is formed at the crossing part of the chamber and the pivoting hole slot in order to accommodate an oblique gear. A handle and a rotating rod are molded and combined. A dented flash slot of an appropriate depth is formed on the front end of the handle and peripheral surface of the rotating rod. When the handle penetrates the pivoting hole slot of the handle part by the rotating rod, the flash slot can be used to let the front end protruding column be pushed to the chamber of the head end part. This facilitates the oblique gear to lock on the front end protruding column. Then the oblique gear is moved backward to the open chamber. A ring gear, which uses the dented locking slot is installed at the inner walls of the axial hole accompanied with the positioning beads installed at the slot located at the inner walls of the rotating head in order to be inserted to the rotating head. When the rotating head is inserted into the chamber of the head end part of main body, it can let the ring gear and the oblique gear inside the chamber to combine with each other. It also limits the oblique gear to stay at a fixed position inside the chamber. During the practical operation, the handle can still keep torque output by reciprocating stroke action. Meanwhile, another form of torque output with double action can be achieved through the rotating action of position point which moves the oblique gear and ring gear and finally the rotating head. This solves the drawback of prior art socket wrench. The current inventor, in an embodiment of the prior art U.S. Pat. No. 6,718,850 B2, has found that the handle and the rotating rod of the prior art are two individual components. Rotating rod is placed in a handle mold in order to be combined in a molding process. During the process, in order to obtain combination stiffness in the molding process, the rotating rod has to be inserted into the handle for a long distance. The inside of the handle thus has no further space to collect the working socket. This invention mainly aims at improving the effective collecting function of the handle of the previous application case. A handle collecting structure for a socket wrench of the current invention is thus achieved.

SUMMARY OF THE INVENTION

"A handle collecting structure for socket wrench" of the current invention solves the technical problem of the prior art. The socket wrench of the prior art can only provide a basic reciprocating stroke function. Therefore, how to let sockets of different dimensions be concentrated and stably collected at the inside of the handle of the wrench is the technical problem solved by the current invention.

The handle collecting structure for socket wrench of the current invention includes a formed-in-one-piece handle and rotating rod to let a chamber be formed inside the handle so that a pending platform can be inserted and collected inside it. The pending platform is comprised of a semi-circular long rod seat body and cover part which are formed in one piece. Some slot seats of different dimensions are installed at the inside of the seat body to be embedded and positioned by sockets of different dimensions. When the pending platform is inserted into the chamber of the handle by the seat body end, its cover part end can then cover the chamber end. Some sockets can then be conveniently and stably collected inside the handle and become easy to be taken out for use.

DETAILED DESCRIPTION OF THE PREFERRED EMBODIMENT

Figure 1:
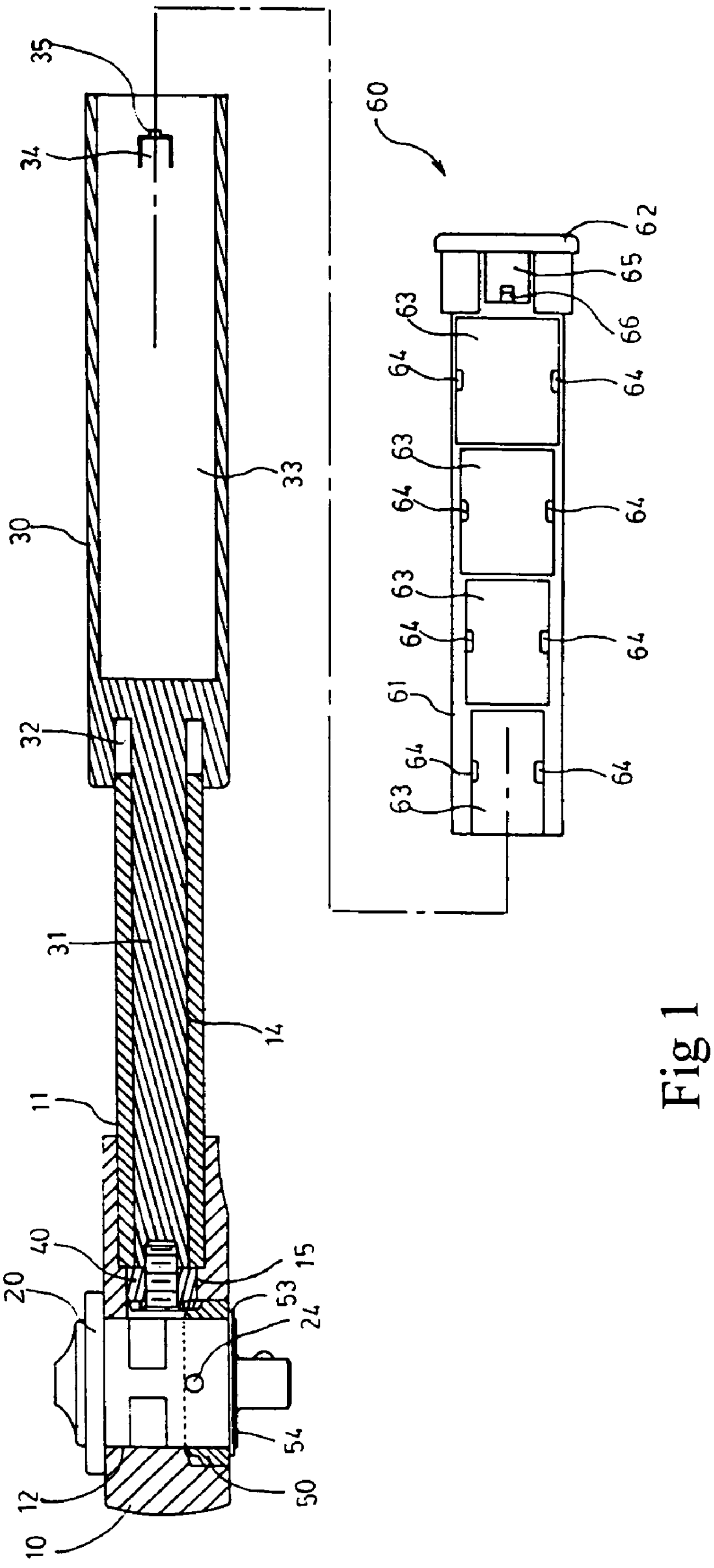
FIG. 1 is an exploded drawing of the handle collecting structure for the socket wrench of the current invention.

In order to help one understand the technical means adopted by the current invention and make its function more apparent, a first embodiment accompanied with the drawings is described in the following:

Please refer to FIG. 1. The socket wrench structure of the current invention basically is the same as the prior art U.S. Pat. No. 6,718,850 B2 "TORQUE TRANSFER MECHANISM FOR SOCKET WRENCH". That is, handle 30 has a rotating rod 31 that penetrates into pivoting hole slot 14 of a handle part 11, through the end an indented flash slot 32 of handle 30 provide a space for the handle part 11 to enter. Therefore, the front end of the rotating rod 31 can extend into a chamber 12 of a head end part 10 of the wrench main body to facilitate the locking of an oblique gear 40 onto the front end of the rotating rod 31. Meanwhile, after locking is completed, oblique gear 40 is pulled back to the open chamber 15. Furthermore, a rotating head 20 is placed inside the chamber 12 through a top side of the head end part 10 of the wrench main body. A ring gear 50 is placed onto the rotating head 20 through a bottom end of the chamber 12. The ring gear 50 is assembled and positioned through positioning bead 24 located in between a slot of rotating head 20 and the locking dented slots of ring gear 50. A C shape combination ring 53 is embedded in the embedded slot 54 of the rotating head 20. The rotating head 20 can then be assembled inside the chamber 12 of the head end part 10 of the wrench main body. Meanwhile, the ring gear 50 is closely connected to the oblique gear 40. The oblique gear 40 can then be limited to be located stably inside the open chamber. Therefore, the socket wrench has double actions such as: handle 30 has a torque output function during a horizontal reciprocal stoke action, and handle 30 also has a torque output function of during axial rotation, i.e., during a fixed point rotation. The main technical features of the current invention are as in the followings:

Handle 30 and rotating rod 31 are metallic and formed in one piece. Therefore, the rotating rod 31 can be placed and installed directly at the bottom center of the ring-shaped flash slot 32 at the front end of the handle 30. This feature enhances not only the strength between handle 30 and rotating rod 31, but also forms a chamber 33 having an accommodation function inside the handle. An end of the inner walls of the chamber 33 is installed with locking hole 35 having a spring piece 34.

Figure 3:
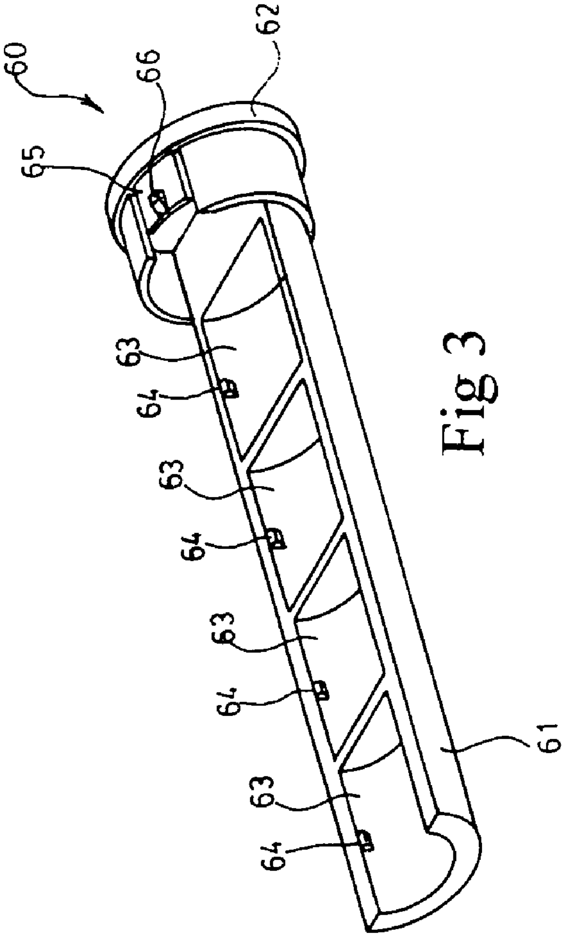
FIG. 3 is a perspective view of the handle collecting structure of the current invention.

Please refer to FIG. 3. A pending platform 60, includes a semi-cylindrical long rod shape seat body 61 and cover part. The seat body 61 is formed with slot seats 63 of different dimensions. An inner wall of each slot seat 63 is provided with a protecting piece. The cover part 62 includes a locking piece 66 having a spring piece 65.

Figure 2:
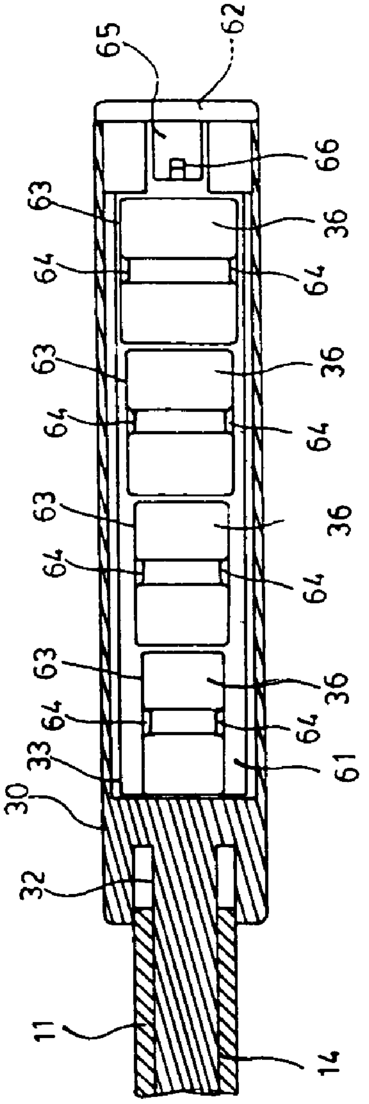
FIG. 2 is the sectional drawing of the pending platform of the current invention.

Please refer to FIG. 2. Sockets 36 of different dimensions are positioned in order in the slot seat 63 of seat body 61 of the pending platform 60. The protecting piece 64 formed on the walls of the slot seat 63 can closely clamp socket 36 in its inside for positioning. When the end of seat body 61 of pending platform 60 is pushed into chamber 33 of handle 30, the locking piece 66 of cover part 62 can then be locked to locking hole 35 formed on the walls of chamber 33 and stay still there. Therefore, some sockets 36 can then be collected together at the inside of the chamber 33 of the handle 30. If the socket 36 is to be taken out, the spring piece 34 formed on the handle 30 can be pressed to let the spring piece 65 on the pending platform sink down. Then, the locking piece 66 of the pending platform 60 can be released from the locking hole 35 of the handle 30. The pending platform 60 can then be pulled out, and the sockets 36 installed inside are then ready to use.

From the above-mentioned, we know that the handle structure for the current invention has at least the following practical purposes, such as:

First, it can collect together and stably contain sockets of different dimensions to the inside of the handle of the socket wrench.

Second, during the horizontal stroke operation of the handle of the socket wrench for stroke torque output or rotating torque output, although the inside of the handle has collected some sockets of different dimensions, they are stably clamped and embedded to the inside of the slot seat of the pending platform. Therefore, no collision noise will be heard.

Third, when one of the sockets is taken out for use, the other sockets can still be collected together inside the slot seat of the pending platform. Therefore, there is no lost socket problem.

However, the above-mentioned is only a preferred embodiment of the current invention. It is not used to limit the application scope of the current invention. Any equivalent changes and modifications without departing from the spirit of the claims of the current invention, should still fall within the scope of the claims of the current invention.

Symbol descriptions

| | | |
|---|---|---|
| 10 Head end part | 11 Handle part | 12 Chamber |
| 14 Pivoting hole slot | 15 Chamber | 20 Rotating head |
| 24 Positioning bead | 30 Handle | 31 Rotating rod |
| 32 Flash slot | 33 Chamber | 34 Spring piece |
| 35 Locking hole | 36 Socket | 40 Oblique gear |
| 50 Ring gear | 53 C shape combination ring | 54 Embedded slot |
| 60 Pending platform | 61 Seat body | 62 Cover part |
| 63 Slot seat | 64 Projecting piece | 65 Spring piece |
| 66 Locking piece | | |

What is claimed is:

1. A socket wrench, comprising:

a head part having a chamber formed therein;

a rotating head disposed in the chamber of said head part;

a metallic handle having an accommodating chamber formed therein, and which is accessible through an opening located at a rear end of said handle, said handle having an axially-arranged ring-shaped slot disposed at a front end of said handle, said handle further having a flexible spring piece disposed in a region of the rear end of said handle, and a locking hole formed on a wall of the accommodating chamber and adjacent to the flexible spring piece;

a metallic rotating rod having an end integrally attached to the front end of said handle to form a unitary, one-piece construction, and being axially-disposed inside of the ring-shaped slot, said handle being coupled to said rotating head by way of said metallic rotating rod, said handle and rod being movable both in a reciprocating manner to output a torque force, and being axially rotatable about a fixed point to output a further torque force, to cause said rotating head to rotate; and a pending platform, including:

a long rod seat body that is configured to have a cylinder shape that is divided lengthwise in half so as to be semi-cylindrical, so that a cross-section thereof has a semi-circular shape of about 180 degrees, and which is removably insertable into the accommodating chamber by way of the opening located at the rear end of said handle, said seat body being formed with a plurality of separated slot seats each having a different dimension for respectively accommodating a different sized socket, said seat body further including a plurality of projecting pieces, each being formed on a side wall of a respective slot seat, each said projecting piece projecting radially inward, and pressing against a respective socket received within the respective slot seat, to retain the socket within the slot seat; and a cover part disposed at an end of said seat body and which covers the opening located at the rear end of said handle, when said semi-cylindrical long rod seat body is inserted into the accommodating chamber, said cover part including a flexible spring piece having a locking piece disposed thereon, the locking piece being receivable within the locking hole formed on the wall of the accommodating chamber, to secure said seat body within the accommodating chamber, the locking piece being released from the locking hole by pressing the flexible spring piece on said handle, which consequently presses against and moves the flexible spring piece of said cover part, to thereby move the locking piece from the locking hole, the flexible spring pieces, the locking piece and the locking hole being positioned relative to the slot seats so that when they are located facing upwards, the respective slot seats will also all face upwards, thereby ensuring the respective sockets will not inadvertently drop from the respective slot seats, when a user removes the seat body from the accommodating chamber.

2. A socket storage arrangement for a socket wrench, comprising:

a handle having an accommodating chamber formed therein, and which is accessible through an opening located at a rear end of said handle, said handle having a flexible spring piece disposed in a region of the rear end of said handle, and a locking hole formed on a wall of the accommodating chamber and adjacent to the flexible spring piece, said handle being movable to output a torque force, to cause a rotating head of the socket wrench to rotate; and a pending platform, including:

a long rod seat body that is configured to have a cylinder shape that is divided lengthwise in half so as to be semi-cylindrical, so that a cross-section thereof has a semi-circular shape of about 180 degrees, and which is removably insertable into the accommodating chamber by way of the opening located at the rear end of said handle, said seat body being formed with a plurality of separated slot seats each having a different dimension for respectively accommodating a different sized socket, said seat body further including a plurality of projecting pieces, each being formed on a side wall of a respective slot seat, each said projecting piece projecting radially inward, and pressing against a respective socket received within the respective slot seat, to retain the socket within the slot seat; and a cover part disposed at an end of said seat body and which covers the opening located at the rear end of said handle, when said semi-cylindrical long rod seat body is inserted into the accommodating chamber, said cover part including a flexible spring piece having a locking piece disposed thereon, the locking piece being receivable within the locking hole formed on the wall of the accommodating chamber, to secure said seat body within the accommodating chamber, the locking piece being released from the locking hole by pressing the flexible spring piece on said handle, which consequently presses against and moves the flexible spring piece of said cover part, to thereby move the locking piece from the locking hole, the flexible spring pieces, the locking piece and the locking hole being positioned relative to the slot seats so that when they are located facing upwards, the respective slot seats will also all face upwards, thereby ensuring the respective sockets will not inadvertently drop from the respective slot seats, when a user removes the seat body from the accommodating chamber.

* * * * *